US009495580B2

(12) United States Patent
Kim et al.

(10) Patent No.: US 9,495,580 B2
(45) Date of Patent: Nov. 15, 2016

(54) FACE RECOGNITION APPARATUS AND METHOD USING PLURAL FACE IMAGES

(75) Inventors: Hong-Il Kim, Gyeonggi-do (KR);
Sung-Dae Cho, Gyeonggi-do (KR);
Chung-Hoon Kim, Gyeonggi-do (KR);
So-Yeon Kang, Seoul (KR)

(73) Assignee: Samsung Electronics Co., Ltd (KR)

( * ) Notice: Subject to any disclaimer, the term of this patent is extended or adjusted under 35 U.S.C. 154(b) by 393 days.

(21) Appl. No.: 13/032,695

(22) Filed: Feb. 23, 2011

(65) Prior Publication Data
US 2011/0222744 A1    Sep. 15, 2011

(30) Foreign Application Priority Data
Mar. 9, 2010   (KR) .......................... 10-2010-0020857

(51) Int. Cl.
*G06K 9/00*   (2006.01)
(52) U.S. Cl.
CPC ................. *G06K 9/00281* (2013.01)
(58) Field of Classification Search
CPC ............ G06K 9/00288; G06K 9/00228; G06K 9/00248; G06K 9/00268; G06K 9/0028; G06K 9/3208; G06K 9/00221; G06T 7/004; G06T 3/60
USPC ......................................... 382/118, 154, 296
See application file for complete search history.

(56) References Cited

U.S. PATENT DOCUMENTS

| 7,551,755 B1* | 6/2009 | Steinberg ........... G06K 9/00228 340/5.53 |
| 7,697,732 B2* | 4/2010 | Kondo et al. ................ 382/115 |
| 7,961,908 B2* | 6/2011 | Tzur et al. .................... 382/103 |
| 2003/0123713 A1* | 7/2003 | Geng ................ G06K 9/00288 382/118 |
| 2006/0062435 A1* | 3/2006 | Yonaha ........................ 382/118 |
| 2008/0310720 A1* | 12/2008 | Park et al. .................... 382/181 |
| 2009/0060295 A1 | 3/2009 | Inoue et al. |
| 2009/0309878 A1* | 12/2009 | Otani ................ G06K 9/00208 345/427 |

FOREIGN PATENT DOCUMENTS

| KR | 100467152 | 1/2005 |
| KR | 1020080100097 | 11/2008 |
| KR | 1020080104034 | 11/2008 |

* cited by examiner

*Primary Examiner* — Kim Vu
*Assistant Examiner* — Michael Vanchy, Jr.
(74) *Attorney, Agent, or Firm* — The Farrell Law Firm, P.C.

(57) ABSTRACT

A face recognition apparatus and method using plural face images includes detecting a reference face image from an image input for registration in advance, calculating plural face feature information from a frontal face image if the detected reference face image includes the frontal face image, generating plural compared face images using the calculated plural face feature information, and determining whether the input face image matches the generated plural compared face images by comparing the input face image with the plural compared face images. Face images having diverse points of view are generated through single user registration, and thus the face recognition ratio can be heightened.

12 Claims, 4 Drawing Sheets

FACE RECOGNITION APPARATUS AND METHOD USING PLURAL FACE IMAGES

PRIORITY

This application claims priority under 35 U.S.C. §119(a) to an application entitled "Face Recognition Apparatus And Method Using Plural Face Images" filed in the Korean Intellectual Property Office on Mar. 9, 2010, and assigned Serial No. 10-2010-0020857, the entire disclosure of which is incorporated herein by reference.

BACKGROUND OF THE INVENTION

1. Field of the Invention

The present invention relates generally to an apparatus and method for recognizing a face from an image, and more particularly to an apparatus and method for recognizing a face from an input image using plural face images.

2. Description of the Related Art

With the development of information technology within society, identity confirmation technologies for identifying a person, have become important. In order to improve personal information protection and identity confirmation using a computer, biometric technologies using human physiological features are frequently being researched.

Among the biometric technologies, face recognition technology has been evaluated as a convenient and competitive biometric technology due to its advantage of confirming the identity of a user in a non-contact manner, unlike recognition technologies that require user operation or action, such as fingerprint recognition, iris recognition, and the like.

In general, according to face recognition technology, face images used to recognize faces are registered in advance, and a face is recognized by comparing a registered face image with a face image detected from an input image.

Such face recognition technology has been widely used in diverse fields and applications, such as summarizing a moving image using face information, identification, Human Computer Interface (HCI) image search, security, monitoring systems, and the like, and applied as one of the core technologies for a multimedia database search.

As described above, according to the face recognition method in the related art, face images to be used for face recognition are registered in advance, and a face is recognized by comparing an image input for face recognition with a registered face image.

However, the face recognition method in the related art has the problem that if a face image, which is registered by a user in a specified point of view, is input in a different position from the face image registered for face recognition, the face recognition may not be accurately performed.

Another problem of the face recognition method in the related art is that a user should register a face image several times when the user registers the face image to be used for the face recognition, and if the user registers the face image only once, the number of images to be compared with the input image is decreased to lower the face recognition ratio.

SUMMARY OF THE INVENTION

Accordingly, the present invention has been made to solve the above-mentioned problems occurring in the related art. The present invention provides a face recognition apparatus and method through generation of face images in several positions when a user registers the corresponding face image.

In accordance with an aspect of the present invention, there is provided a face recognition apparatus using plural face images, which includes a face detection unit detecting a reference face image from an image input for registration in advance; a face feature point calculation unit calculating plural face feature information from a frontal face image if the detected reference face image is the frontal face image; a compared face generation unit generating plural compared face images using the calculated plural face feature information; and a face recognition unit determining whether the input face image matches the generated plural compared face images by comparing the input face image with the plural compared face images.

In accordance with another aspect of the present invention, there is provided a face recognition method using plural face images, which includes detecting a reference face image from an image input for registration in advance; calculating plural face feature information from a frontal face image if the detected reference face image is the frontal face image; generating plural compared face images using the calculated plural face feature information; and determining whether the input face image matches the generated plural compared face images by comparing the input face image with the plural compared face images.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF EMBODIMENTS OF THE PRESENT INVENTION

Hereinafter, embodiments of the present invention will be described with reference to the accompanying drawings. In the following description of the present invention, a detailed description of known functions and configurations incorporated herein will be omitted when it may make the subject matter of the present invention rather unclear.

Figure 1:
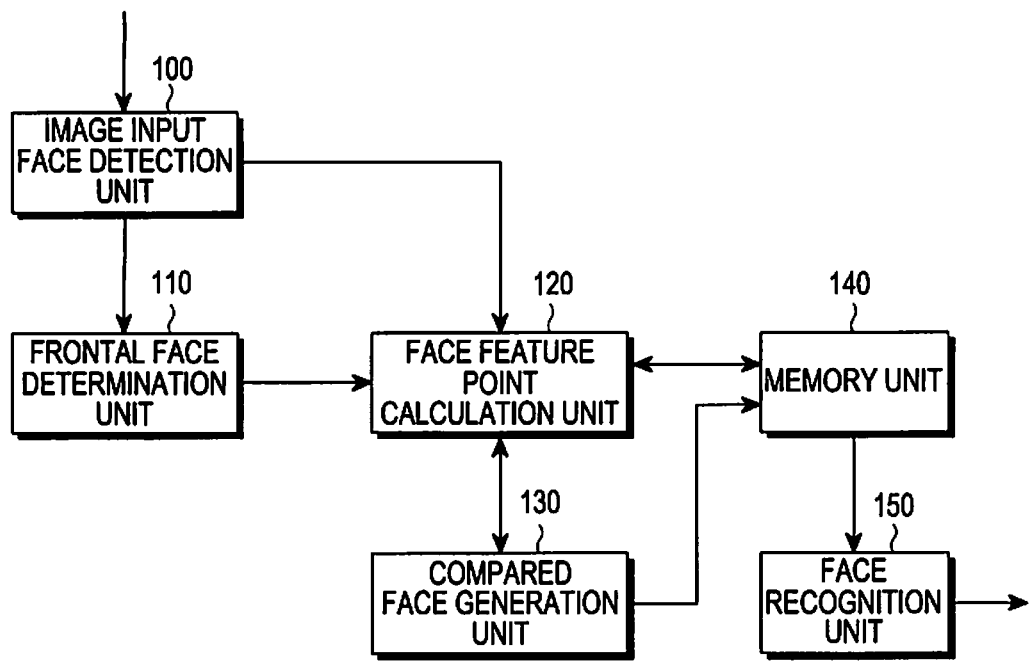
FIG. 1 is a diagram illustrating the configuration of a face recognition apparatus according to an embodiment of the present invention.

FIG. 1 is a diagram illustrating the configuration of a face recognition apparatus according to an embodiment of the present invention.

A face recognition apparatus according to an embodiment of the present invention includes a face detection unit 100, a frontal face determination unit 110, a face feature point calculation unit 120, a compared face generation unit 130, a memory unit 140, and a face recognition unit 150. For example, the face recognition apparatus may be a Central Processing Unit (CPU) or a scanner.

The face detection unit 100 determines whether a face image is included in an image input for registration in advance, and if the face image is included, extracts the corresponding face image. Here, the face detection unit 100 performs a face detection operation using a general face detection method, where a face extraction technology using a contour of a face, skin color, skin texture, template, and the like, may be used. For example, the face detection unit 100 may perform face study as it scans plural face images, and may detect a face image from the input image through the performed face study.

The frontal face determination unit 110 determines whether the detected face image is a frontal face image that is seen from the frontal or a non-frontal face image that is not seen from the front. The frontal face determination unit 110 determines the front of the face in diverse methods. Specifically, the frontal face determination unit 110 performs a frontal face study by scanning plural frontal face images, and determines that the face image detected through the performed study represents the frontal face. That is, a frontal face image is one in which at least the eyes, nose, mouth, and ears are visible.

If the determined face is the front of the face, the frontal face determination unit 110 outputs the determined face image to the feature point calculation unit 120, while if the determined face is the non-frontal face, the frontal face determination unit 110 detects eye position information from the corresponding face image, and then stores the detected eye position information in the memory unit 140.

The face feature point calculation unit 120 calculates position information of the eyes, nose, and mouth from the frontal face image in the advance registration process, and then outputs the calculated position information to the compared face generation unit 130.

Also, the face feature point calculation unit 120 calculates the face feature points from the plural compared face images generated by the compared face generation unit 130, and calculates compared feature point vector values for the calculated face feature points.

Thereafter, the face feature point calculation unit 120 calculates the object face feature points such as eyes from the face image that is detected when a process for the face recognition is performed, calculates the feature point vector values for the calculated face feature points, and outputs the calculated feature point vector values to the face recognition unit 150.

The compared face generation unit 130 generates plural compared face images using the calculated face feature points. Specifically, the compared face generation unit 120 generates the plural compared face images that are seen in several positions, such as in upward, downward, left, and right directions, using the calculated position information of the eyes, the nose, and the mouth. The plural compared face image set as above may be illustrated as in FIG. 2.

The compared face generation unit 120 divides the frontal face image into two regions based on a predetermined symmetrical axis, reduces the image size of one of the divided face images, and increases the image size of the other of the divided face images.

Figure 2:
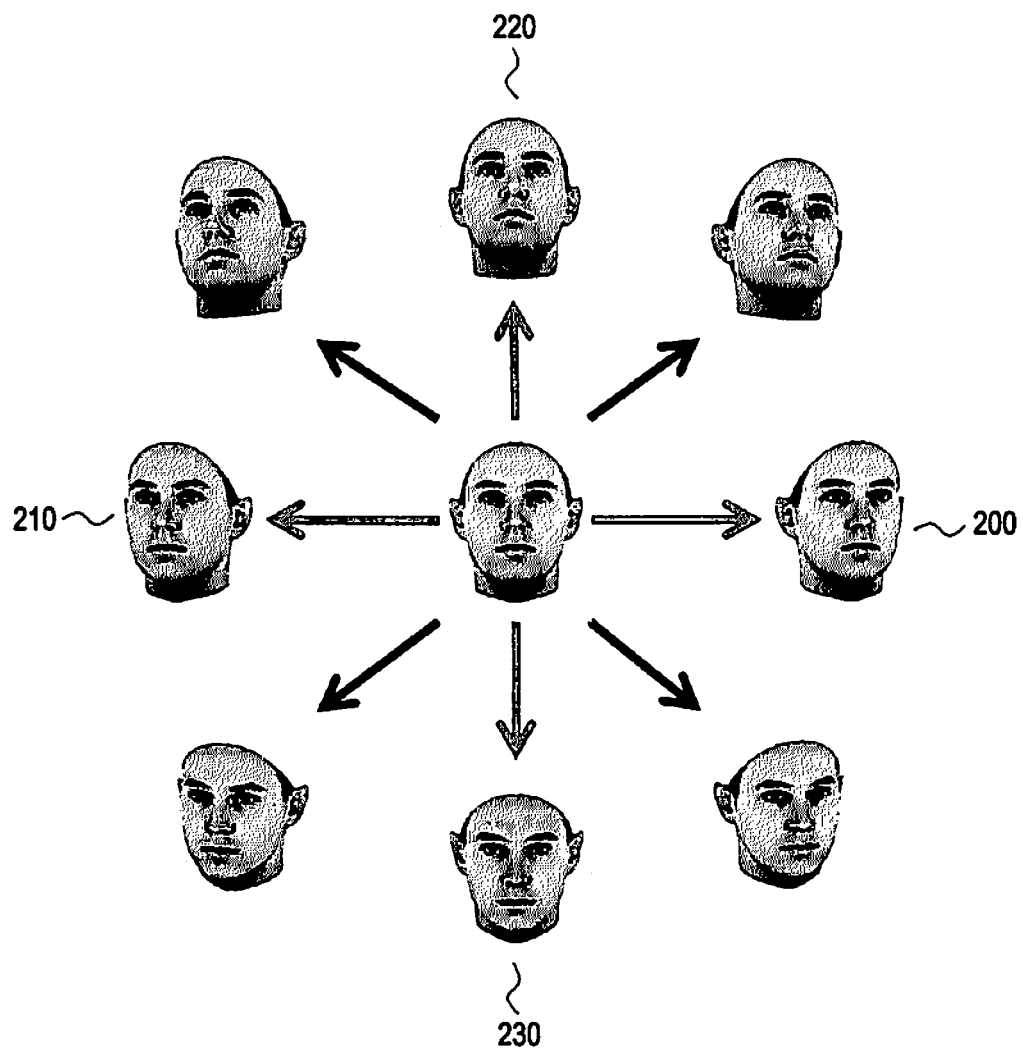
FIG. 2 is a diagram illustrating plural compared face images generated by a compared face generation unit according to an embodiment of the present invention.

For example, the compared face generation unit 120 may set a face that sees in the right direction by setting a center vertical axis of the frontal face image as a first symmetrical axis using the calculated position information of the eyes, the nose, and the mouth, decreasing the width of the left-side face image, and increasing the width of the right-side face image around the first symmetrical axis as represented by a reference numeral 200 in FIG. 2. Also, the compared face generation unit 120 may set a face that faces in the left direction by decreasing the width of the right-side of the face image, and increasing the width of the left-side of the face image around the first symmetrical axis as represented by a reference numeral 210 in FIG. 2.

Also, the compared face generation unit 120 may set a face that faces in the upward direction by setting a center horizontal axis that crosses the center vertical axis as a second symmetrical axis, decreasing the width of the upper-side of the face image, and increasing the width of the lower-side of the face image around the second symmetrical axis as represented by a reference numeral 220 in FIG. 2. Also, the compared face generation unit 120 may set a face that faces in the downward direction by increasing the width of the upper-side of the face image, and decreasing the width of the lower-side of the face image around the second symmetrical axis as represented by a reference numeral 230 in FIG. 2.

In addition, the compared face generation unit 120 may set compared face images so that the frontal face image is seen as faces that face in nine directions as illustrated in FIG. 2.

In another example, the compared face generation unit 120 may generate the compared face images as illustrated in FIG. 2, by generating a three-dimensional (3D) face image using the calculated position information of the eyes, the nose, and the mouth, and capturing the face image so that the generated 3D face image faces in the upward, downward, left, and right directions.

The memory unit 140 stores plural face feature information by character categories to correspond to plural character categories.

Specifically, the memory unit 140 stores the face feature point vector values for the eye position information calculated from the non-frontal image as the face feature information of a specified person, and stores the plural compared feature point vector values calculated by the face feature point calculation unit 120 to correspond to the users.

The face recognition unit 150 determines whether the face compared feature point vector values pre-stored by users in the memory unit 140 matches the calculated object feature point vector values by comparing the feature point vector values with each other when the face recognition process is performed. Thereafter, the face recognition unit 150 calculates the maximum correlation vector value having the largest correlation among the compared feature point vector values of the users. For example, the face recognition unit 150 may calculate the object feature point vector values having the smallest difference value by users among respective different values between the plural compared feature point vector values corresponding to the users and the object feature point vector values as the maximum correlation vector values.

Thereafter, the face recognition unit 150 confirms a person who corresponds to the maximum correlation vector value having the largest value among the calculated maximum correlation vector values by users, and outputs the confirmed person as the resultant value of the face recognition.

As described above, according to the present invention, since a user can generate face images in diverse face directions through one registration, the face recognition ratio can be heightened and the resources and time required to perform the face recognition can be reduced.

Figure 3:
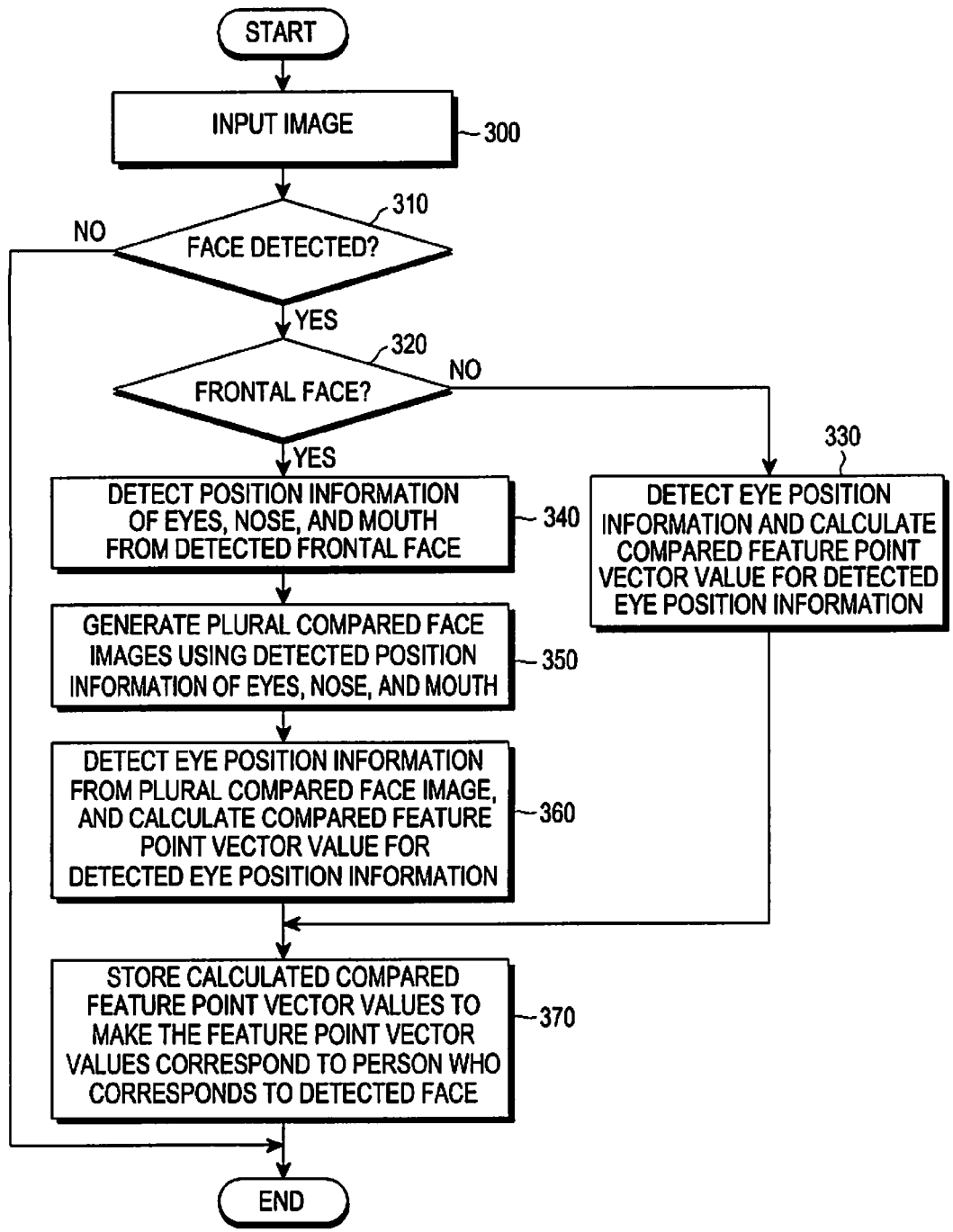
FIG. 3 is a flowchart illustrating a process for registering a face image that is used for face recognition in a face recognition apparatus according to an embodiment of the present invention.

FIG. 3 is a flowchart illustrating a process for registering a face image that is used for face recognition in a face recognition apparatus according to an embodiment of the present invention.

Referring to FIG. 3, if an image is input in Step 300, the face detection unit 100 determines whether the face image is detected from the input image in Step 310, and if the face image is detected, the face detection unit 100 proceeds to Step 320, while if not, the face detection unit 100 terminates the face detection.

In Step 320, the frontal face determination unit 110 determines whether the detected face image is a frontal face image, and if the detected face image is the frontal face image, the frontal face determination unit 110 proceeds to Step 340, while if not, the frontal face determination unit 110 proceeds to Step 330.

In Step 330, the face feature point calculation unit 120 detects the eye position information from the detected face image, calculates compared feature point vector values for the detected eye position information, and then proceeds to Step 370.

The face feature point calculation unit 120, which has proceeded from Step 320 to Step 340, detects position information of the eyes, nose, and mouth from the frontal face image, and outputs the detected position information to the compared face generation unit 130.

In Step 350, the compared face generation unit 130 generates plural compared face images using the detected position information of the eyes, nose, and mouth, and outputs the plural compared face images to the feature point calculation unit 120. At this time, as described above, the compared face generation unit 130 generates plural compared face images that are seen in several positions, such as in upward, downward, left, and right directions, using the calculated position information of the eyes, nose, and mouth. For example, the compared face generation unit 130 can generate plural compared faces by dividing the frontal face image into two regions based on a predetermined symmetrical axis, reducing the image size of one of the divided face images, and increasing the image size of the other of the divided face images.

In Step 360, the face feature point calculation unit 120 detects eye position information from the generated plural compared face images, and calculates the compared feature point vector values for the detected eye position information. Here, the compared feature point vector values mean values that are compared with the feature point vector values that correspond to the input face image when the face recognition operation is performed. Although it is exemplified that the eye position information is extracted, the feature point vector values for the face feature information such as a nose or a mouth on the face may be calculated in addition to the eye position information.

In Steps 360 and 330, the feature point calculation unit 120, which has proceeded to Step 370, makes the calculated plural compared feature point vector values correspond to a character category corresponding to the detected face, stores the plural compared feature point vector values in the memory unit 140, and then terminates the face registration process.

As described above, according to the present invention, since a user can generate face images in diverse face directions through one registration, the face recognition ratio can be heightened and the resources and time required to perform the face recognition can be reduced.

Figure 4:
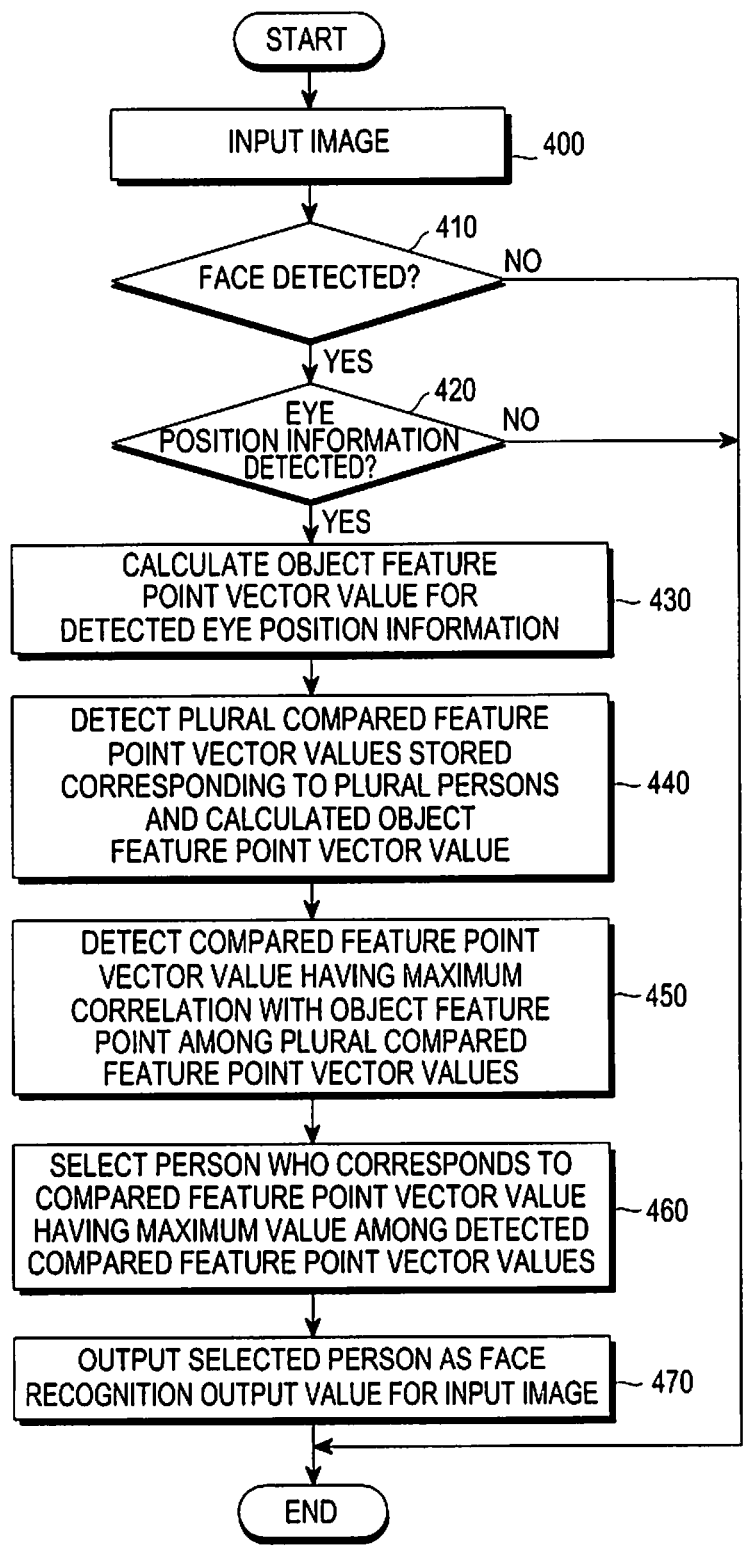
FIG. 4 is a flowchart illustrating a process for recognizing a face of an input image in a face recognition apparatus according to an embodiment of the present invention.

FIG. 4 is a flowchart illustrating a process for recognizing a face of an input image in a face recognition apparatus according to an embodiment of the present invention.

Referring to FIG. 4, if an image is input in Step 400, the face detection unit 100 determines whether the face image is detected from the input image in Step 410, and if the face image is detected, the face detection unit 100 proceeds to Step 420, while if not, the face detection unit 100 terminates the face detection.

In Step 420, the face feature point calculation unit 120 determines whether the eye position information is detected from the detected face image, and if the eye position information is detected, the face feature point calculation unit 120 proceeds to Step 430, while if not, the face feature point calculation unit 120 terminates the face recognition operation.

In Step 430, the face feature point calculation unit 120 calculates and outputs the object feature point vector values for the detected eye position information to the face recognition unit 150.

In Step 440, the face recognition unit 150 compares the plural compared feature point vector values that correspond to the respective users stored in the memory unit 140 with the calculated object feature point vector value.

In Step 450, the face recognition unit 150 detects the compared feature point vector values having the largest correlation with the object feature point vector value among the compared feature point vector values that correspond to the users.

For example, in the case where plural compared feature point vector values for 20 users in total are pre-stored, the face recognition unit 150 detects the compared feature point vector value having the largest correlation with the object feature point vector value among the plural compared feature point vector values which are stored to correspond to a first person. Thereafter, the face recognition unit 150 detects the compared feature point vector values having the largest correlation with the object feature point vector value among the plural compared feature point vector values stored to correspond to a second person to twentieth person, respectively.

In Step 460, the face recognition unit 150 selects a person who corresponds to the compared feature point vector value having the maximum value among the compared feature point vector values calculated by users, and outputs the person selected in Step 470 as the face recognition output value of the input image.

As described above, according to the present invention, since face images in diverse directions are generated through a frontal face image registered in advance and face recognition is performed using the generated face images, the face is recognized from the face images at diverse angles, and thus a high face recognition ratio can be obtained.

Also, since an additional operation such as calculation of face directions and complicated coefficient generation is not performed when face recognition is performed, the time and resources required to perform face recognition can be reduced and the performance of the face recognition apparatus can be heightened.

While the operation and configuration of the face recognition apparatus and method using plural face images have been shown and described with reference to certain embodiments thereof, it will be understood by those skilled in the art that various changes in form and details may be made therein without departing from the spirit and scope of the invention as defined by the appended claims.

What is claimed is:
1. A face recognition apparatus using plural face images, comprising:
   a non-transitory memory;
   a face detection unit configured to detect a reference face image from an image for registration;

a face feature point calculation unit configured to calculate plural face feature information from a two-dimensional (2-D) frontal face image if the detected reference face image includes the 2-D frontal face image, and storing the calculated plural face feature information in the non-transitory memory;

a compared face generation unit configured to generate 2-D plural compared face images based on a size adjustment about a plurality of symmetrical axes of the identical 2-D frontal face image, using the calculated plural face feature information, wherein directions of the 2-D plural compared face images are respectively different from each other, and wherein one side of a symmetrical axis of the identical 2-D frontal face image is increased in size while an opposing side of the symmetrical axis of the identical 2-D frontal face image is decreased in size; and a face recognition unit configured to determine whether an input face image matches the generated 2-D plural compared face images by comparing the input face image with the 2-D plural compared face images.

2. The face recognition apparatus as claimed in claim 1, wherein the non-transitory memory comprises a memory unit storing plural face feature information by character categories to correspond to plural character categories;

wherein the face feature point calculation unit detects at least one position information of an eye, a nose, and a mouth from the 2-D frontal face image.

3. The face recognition apparatus as claimed in claim 2, wherein the compared face generation unit generates the 2-D plural compared face images by dividing the 2-D frontal face image into two regions based on the plurality of symmetrical axes using the calculated position information, reducing the image size of one of the divided face images, and increasing the image size of the other of the divided face images.

4. The face recognition apparatus as claimed in claim 3, wherein the face feature point calculation unit detects face feature information from the generated 2-D plural compared face images, calculates compared feature information vector values for the calculated face feature information, and stores the calculated compared feature information vector values in the memory unit to make the calculated compared feature information vector values correspond to the character category that corresponds to the detected face image.

5. The face recognition apparatus as claimed in claim 4, wherein the face feature point detection unit detects object face feature information from the detected face image, and calculates an object feature point vector value for the detected object face feature information.

6. The face recognition apparatus as claimed in claim 5, wherein the face recognition unit searches for the compared feature point vector value having the largest correlation with the object feature point vector value by character categories by comparing the plural compared feature point vector values stored in the memory unit with the calculated object feature point vector value, selects the compared feature point vector value having the maximum correlation among the compared feature point vector values searched by character categories, and outputs a person who corresponds to the selected compared feature point vector value as the result of recognition.

7. A face recognition method using plural face images, comprising the steps of:

detecting, by a face detection unit, a reference face image from an image for registration;

calculating, by a face feature point calculation unit, plural face feature information from a two-dimensional (2-D) frontal face image if the detected reference face image includes the 2-D frontal face image, and storing the calculated plural face feature information in a non-transitory memory;

generating, by a compared face generation unit, 2-D plural compared face images based on a size adjustment about a plurality of symmetrical axes of the identical 2-D frontal face image, using the calculated plural face feature information, wherein directions of the 2-D plural compared face images are respectively different from each other, and wherein one side of a symmetrical axis of the identical 2-D frontal face image is increased in size while an opposing side of the symmetrical axis of the identical 2-D frontal face image is decreased in size; and determining, by a face recognition unit, whether an input face image matches the generated 2-D plural compared face images by comparing the input face image with the 2-D plural compared face images.

8. The face recognition method as claimed in claim 7, further comprising storing plural face feature information by character categories to correspond to plural character categories.

9. The face recognition method as claimed in claim 8, wherein calculating the plural face feature information includes detecting at least one position information of an eye, a nose, and a mouth from the 2-D frontal face image.

10. The face recognition method as claimed in claim 9, wherein generating the 2-D plural compared face images comprises:

dividing the 2-D frontal face image into two regions based on the plurality of symmetrical axes using the calculated position information; and reducing the image size of one of the divided face images, and increasing the image size of the other of the divided face images.

11. The face recognition method as claimed in claim 10, further comprising:

detecting object face feature information from the detected face image after generating the 2-D plural compared face images; and calculating an object feature point vector value for the detected object face feature information.

12. The face recognition method as claimed in claim 11, wherein determining whether the input face image matches the generated 2-D plural compared face images comprises:

comparing the pre-stored plural compared feature point vector values with the calculated object feature point vector value;

searching for the compared feature point vector value having the largest correlation with the object feature point vector value by character categories in accordance with the result of comparison;

selecting the compared feature point vector value having the maximum correlation among the compared feature point vector values searched by character categories; and outputting a person who corresponds to the selected compared feature point vector value as the result of recognition.

* * * * *